US009658634B2

(12) United States Patent
Tripathi et al.

(10) Patent No.: US 9,658,634 B2
(45) Date of Patent: May 23, 2017

(54) UNDER VOLTAGE DETECTION AND PERFORMANCE THROTTLING

(71) Applicant: Apple Inc., Cupertino, CA (US)

(72) Inventors: Brijesh Tripathi, Los Altos, CA (US);
Eric G. Smith, Palo Alto, CA (US);
Erik P. Machnicki, San Jose, CA (US);
Jung Wook Cho, Cupertino, CA (US);
Khaled M. Alashmouny, Santa Clara, CA (US); Kiran B. Kattel, San Francisco, CA (US); Vijay M. Bettada, Fremont, CA (US); Bo Yang, Santa Clara, CA (US); Wenlong Wei, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/673,326

(22) Filed: Mar. 30, 2015

(65) Prior Publication Data

US 2016/0291625 A1  Oct. 6, 2016

(51) Int. Cl.
*G06F 1/00* (2006.01)
*G05F 3/02* (2006.01)
*G06F 1/32* (2006.01)

(52) U.S. Cl.
CPC ............... *G05F 3/02* (2013.01); *G06F 1/324* (2013.01); *G06F 1/3296* (2013.01); *Y02B 60/1285* (2013.01)

(58) Field of Classification Search
None
See application file for complete search history.

(56) References Cited

U.S. PATENT DOCUMENTS

| 5,264,740 A | 11/1993 | Wright | |
|---|---|---|---|
| 5,745,375 A * | 4/1998 | Reinhardt | G06F 1/206 700/286 |
| 6,564,328 B1 * | 5/2003 | Grochowski | G06F 1/3203 712/E9.049 |

(Continued)

FOREIGN PATENT DOCUMENTS

CN  104137024  11/2014

OTHER PUBLICATIONS

Office Action and Search Report in ROC (Taiwan) application No. 105108318 issued Jan. 23, 2017.

*Primary Examiner* — Tuan T Lam
(74) *Attorney, Agent, or Firm* — Meyertons, Hood, Kivlin, Kowert & Goetzel, P.C.; Erik A. Heter

(57) ABSTRACT

An under voltage detection circuit and method of operating an IC including the same is disclosed. In one embodiment, an IC includes an under voltage protection circuit having first and second comparators configured to compare a supply voltage to first and second voltage thresholds, respectively, with the second voltage threshold being greater than the first. A logic circuit is coupled to receive signals from the first and second comparators. During operation in a high performance state by a corresponding functional circuit, the logic circuit is configured to cause assertion of a throttling signal responsive to an indication that the supply voltage has fallen below the first threshold. A clock signal provided to the functional circuit may be throttled responsive to the indication. If the supply voltage subsequently rises to a level above the second threshold, the throttling signal may be de-asserted.

20 Claims, 6 Drawing Sheets

(56) References Cited

U.S. PATENT DOCUMENTS

| | | | |
|---|---|---|---|
| 6,762,629 B2 | 7/2004 | Tam et al. | |
| 6,931,559 B2 | 8/2005 | Burns | |
| 7,017,058 B2* | 3/2006 | Chen | G06F 1/206 713/322 |
| 7,263,457 B2 | 8/2007 | White et al. | |
| 8,281,160 B1 | 10/2012 | Bai et al. | |
| 8,527,795 B2* | 9/2013 | Howard | G06F 1/30 713/320 |
| 2007/0288182 A1 | 12/2007 | Douriet | |
| 2011/0055596 A1 | 3/2011 | Wyatt | |
| 2012/0005515 A1 | 1/2012 | Reddi | |
| 2012/0166839 A1 | 6/2012 | Sodhi | |
| 2013/0070363 A1 | 3/2013 | Bennett | |
| 2016/0091960 A1* | 3/2016 | Ismail | G06F 1/324 713/320 |

* cited by examiner

UNDER VOLTAGE DETECTION AND PERFORMANCE THROTTLING

BACKGROUND

Technical Field

This disclosure relates to integrated circuits, and more particularly, circuits for balancing performance and power consumption.

Description of the Related Art

In providing power to an integrated circuit (IC), guard bands between a maximum possible supply voltage and an actual supplied voltage are often implemented. For example, where the circuits of an IC can function without erroneous operation at 0.9 volts, the supply voltage provided thereto may be at 1.0 volts. Similarly, clock frequencies may also be limited to a value that is actually less than a maximum value at which the IC (or functional circuitry therein) could properly operate. For example, if a maximum clock frequency at which a particular IC could operate properly is 1.1 MHz, the clock signal may be provided at 1 MHz.

In many cases, the supply voltage and clock signal frequencies are related to one another in that an IC may be able to properly function at a higher clock frequency when a higher voltage is provided. In some cases, despite guard band specifications, an IC such as a processor may be operated in a performance state that exceeds global guard band ratings (i.e. at a higher voltage and/or clock frequency than rated with guard band). This may allow for higher performance and increased processing throughput for a particular IC.

SUMMARY

An under voltage detection circuit and method of operating an IC including the same is disclosed. In one embodiment, an IC includes an under voltage protection circuit having first and second comparators configured to compare a supply voltage to first and second voltage thresholds, respectively, with the second voltage threshold being greater than the first. A logic circuit is coupled to receive signals from the first and second comparators. During operation in a particular performance state by a corresponding functional circuit, the logic circuit is configured to cause assertion of a throttling signal responsive to an indication that the supply voltage has fallen below the first threshold. A clock signal provided to the functional circuit may be throttled responsive to the indication. If the supply voltage subsequently rises to a level above the second threshold, the throttling signal may be de-asserted. During initialization of the circuit, assertion of the throttling signal may be inhibited until the supply voltage rises to a level above the second threshold.

In one embodiment, the under voltage detection circuit may be operated when a corresponding functional circuit is operating in a high performance state or an accelerated performance state. Otherwise, when operating in lower performance states, assertion of the throttling signal may be inhibited. Counters coupled to the outputs of the first and second counters may determine the number of times the supply voltage crosses their respectively monitored thresholds in a specific time period. If the counter coupled to the first comparator indicates that the throttling signal is not being asserted too often (based on a number of times the supply voltage has fallen below the first threshold during a specific time period), a power management circuit may place the functional circuit into an accelerated performance state that operates at a higher supply voltage. If throttling occurs too often, the power management circuit may then place the functional circuit in a medium performance state having a clock frequency that is lower than that of the high performance state.

BRIEF DESCRIPTION OF THE DRAWINGS

The following detailed description makes reference to the accompanying drawings, which are now briefly described.

Figure 1:
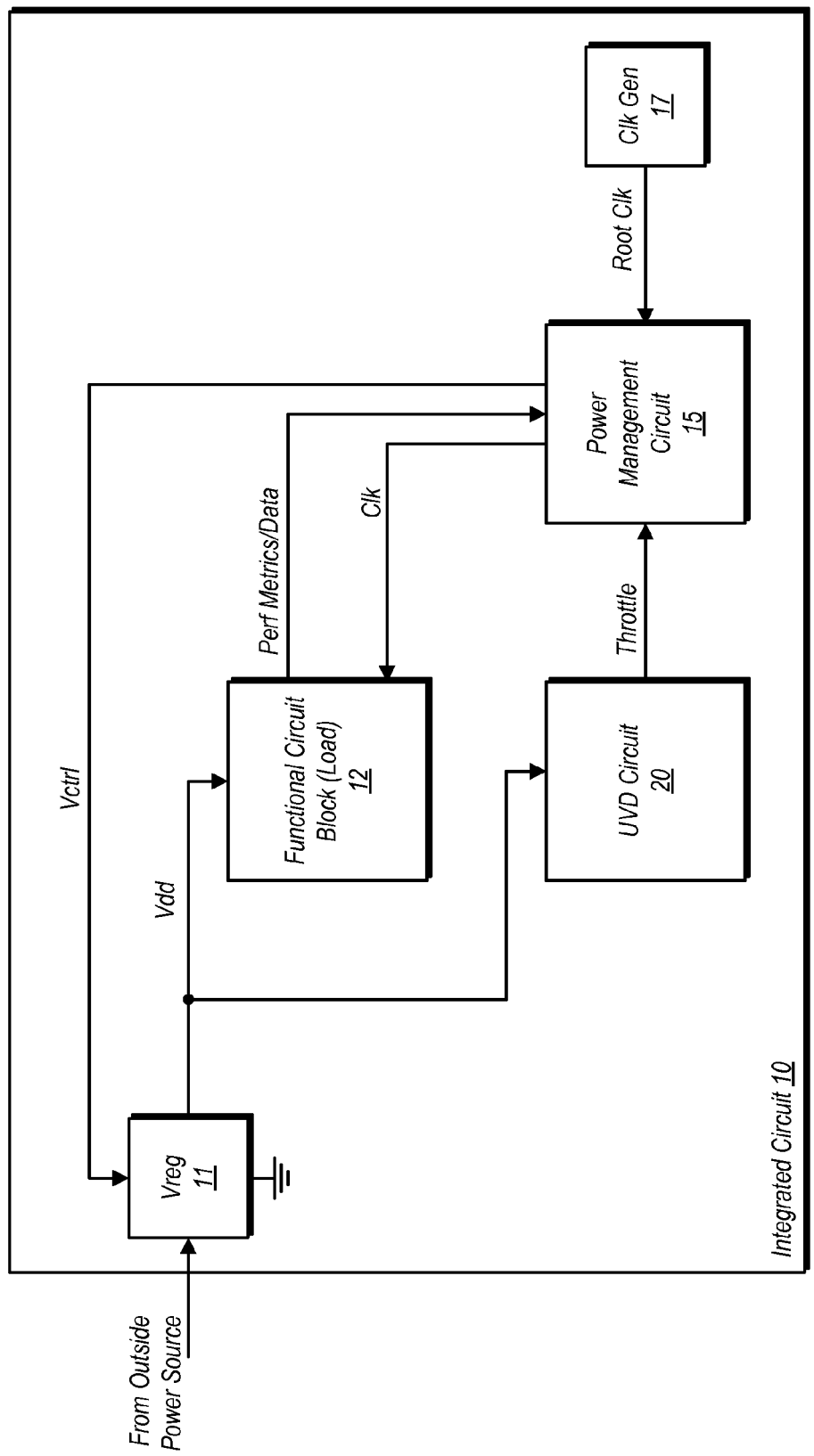
FIG. 1 is a block diagram of one embodiment of an integrated circuit (IC).

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) (or pre-AIA paragraph six) interpretation for that unit/circuit/component.

DETAILED DESCRIPTION OF EMBODIMENTS

Turning now to FIG. 1, a block diagram of one embodiment of an IC is shown. IC 10 as shown in FIG. 1 is an exemplary embodiment used to illustrate various aspects of this disclosure, but is not intended to be limiting. A wide variety of IC embodiments that fall within the scope of this disclosure are possible and contemplated. Furthermore, although IC 10 and the various circuits thereof are discussed below in simplified terms for the sake of understanding, it is to be understood that their functionality is not limited to that which is explicitly discussed.

IC 10 in the embodiment shown includes a voltage regulator (Vreg) 11, a functional circuit bock 12, a power management circuit 15, a clock generator circuit 17, and an under voltage detection circuit 20. The functional circuit block 12 comprises circuitry configured to carry out the main functions of IC 10. Such circuitry may include (but is not limited to) general purpose processing circuitry, graphics processing circuitry, various types of circuits for interfacing with circuits external to IC 10, memory circuits (e.g., caches, registers, etc.), and so on. At least some of the circuitry in IC 10 includes synchronous digital circuits that receive a clock signal, although combinational digital logic circuits and analog circuits may also be included.

The clock signal provided to functional circuit block 12 is initially generated by clock generator circuit 17. The clock generation circuit 17 may be any suitable type of circuitry configured to generate a clock signal, such as a phase locked loop (PLL) or local oscillator. In some embodiments, the clock generation circuit 17 may also include circuitry to shape the clock signal in order to control the duty cycle to a desired value (e.g., 50%). The clock signal output from clock generator circuit 17, Root Clk, may be provided to power management circuit 15.

In the embodiment shown, power management circuit 15 is configured to perform various power management functions for IC 10. Some power management functions may be carried out by controlling a performance state of functional circuit block 12. A given performance state may be defined by a frequency of the clock signal and a supply voltage provided to functional circuit block 12. Generally speaking, the performance states intended to provide greater performance are those having higher clock frequencies and higher supply voltages. Performance states intended to reduce power consumption may be those having lower clock frequencies and lower supply voltages. As such, power management circuit 15 may include circuitry that is capable of exercising control over the frequency of the clock signal provided to functional circuit block 12. Power management circuit 15 in the embodiment shown also includes circuitry that enables it to control the supply voltage, Vdd, provided to functional circuit block 12.

It is noted here that power management circuit 15 and clock generator 17 may receive power from one or more other voltage sources, not explicitly shown, separate from the supply voltage provided to functional circuit block 12.

Various performance metrics and data may be provided from functional circuit block 12 to power management circuit 15 in order for the latter to make determinations of appropriate performance states. The performance metrics/data may include current processing workloads, types of processing workloads (e.g., processor intensive, memory intensive), instructions executed/retired within a given time period, temperature readings, and so on. Based at least in part on this information, power management circuit 15 may exercise control of the frequency of the clock signal and the supply voltage provided to functional circuit block 12.

In the embodiment shown, IC 10 includes a voltage regulator 11 that is configured to receive power from an external power source. Voltage regulator 11 in this embodiment is a variable voltage regulator, and thus its output voltage is controllable. In many embodiments, voltage regulator 11 may be implemented as a switching voltage regulator (e.g., buck converter, boost converter), although embodiments utilizing linear voltage regulators are also possible and contemplated.

During operation of IC 10, functional circuit block 12 may be placed in various high performance operating states. For the purposes of this disclosure, one of these performance states is referred to as a high performance state, while another one of these is referred to as the accelerated performance state. These states may operate at higher voltages and clock frequencies than others, with the accelerated performance state having the highest voltage/frequency combination. It is noted however that the definition of these states is not intended to limit the disclosure.

During operation in the high performance state or the accelerated performance state, power consumption by functional circuit block 12 may be relatively high in comparison to the power delivery capacity of voltage regulator 11. In particular, the current consumption by functional circuit block 12 may be high during operation in these performance states may be high relative to other performance states. At times, the high current consumption may strain the power delivery capacity of voltage regulator 11 and thus lead to a voltage drop of Vdd. The drop of voltage (sometimes referred to as a 'voltage droop') can adversely affect the ability of circuits within functional circuit block 12 to function correctly, if left unchecked. In the embodiment shown, IC 10 includes under voltage detection (UVD) circuit 20. UVD circuit 20 may compare a received voltage on node Vdd to one or more thresholds. Based on detecting a voltage being under a particular threshold, UVD circuit 20 may assert a throttling signal (Throttle') that is provided to power management circuit 15. Responsive to assertion of the throttling signal, power management circuit 15 may throttle the clock signal provided to functional circuit block 12 for a time to allow the supply voltage to recover to a safe level. When UVD circuit 20 detects that the voltage has returned to a safe level, the throttling signal may be de-asserted. UVD circuit 20 may also provide information to power management circuit 15 regarding a number of times the supply voltage crosses various thresholds within a predetermined time period. Based on this information, power management circuit 15 may change the performance state of functional circuit block 12 by changing one or more of the supply voltage or frequency of the clock signal.

Figure 2:
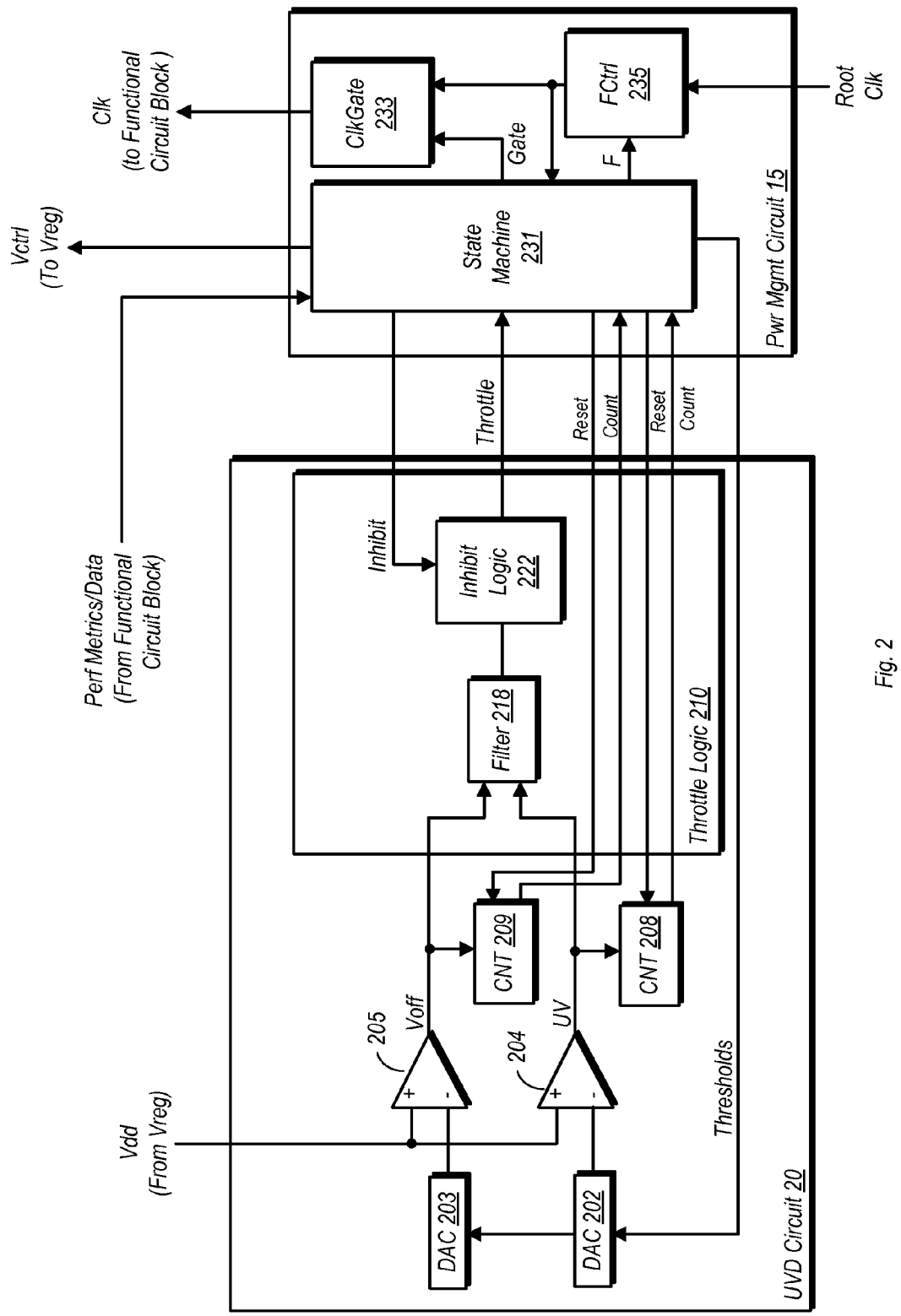
FIG. 2 is a diagram illustrating one embodiment of a under voltage detection circuit operated in conjunction with an embodiment of a power management circuit.

FIG. 2 is a diagram illustrating one embodiment of an under voltage detection circuit operated in conjunction with an embodiment of a power management circuit. In the embodiment shown, UVD circuit 20 includes comparators 204 and 205, each of which is configured to compare the supply voltage, Vdd, to corresponding thresholds. Comparator 204 is coupled to receive a first threshold voltage from digital-to-analog converter (DAC) 202, while comparator 205 is coupled to receive a second threshold voltage from DAC 203.

If the supply voltage falls below the first voltage threshold, comparator 204 may assert the under voltage (UV) signal indicating the presence of an under voltage condition. An under voltage condition occurs when the supply voltage falls below a limit designated as a safe, lower operating limit. For example, the limit may be defined as a lowest possible voltage at which the logic functions of an IC may properly discern a logic 1 voltage from a logic 0 voltage. The designated limit here may be based on limits determined during characterization testing or by another mechanism. In some cases, the limit may include some guard band or safety margin. The assertion of the UV signal may result in UVD circuit 20 asserting the throttling signal provided to power management circuit 15, which may in turn cause throttling of the clock signal.

If the throttling signal has been asserted, and comparator 205 detects that the supply voltage has risen above the second voltage threshold, a turnoff signal (Voff) may be asserted. When this signal is asserted, power management circuit 15 may de-assert the throttling signal. The second voltage threshold may also be used as an arming voltage to determine when assertion of the throttling signal is to be enabled. For example, when transitioning to a performance state in which throttling may be performed, assertion of the throttling signal may be inhibited until the supply voltage has reached a value at least equal to the second voltage threshold, as indicated by the Voff signal. Assertion of the Voff signal may be used as an indication that the supply voltage has risen to a level that is at or above the second voltage threshold, after which assertion of the throttling signal is no longer inhibited in the event of a fall below the first threshold voltage. This may prevent an inadvertent throttling from occurring as the supply voltage is brought up to a level commensurate with the performance state being entered.

UVD circuit includes throttle logic 210. The output signals UV and Voff from comparators 204 and 205, respectively, may be received by a filter 218. The filter 218 may be used to prevent transition of states of the throttling signal resulting from transients occurring on the supply voltage node that are short in duration and otherwise negligible. For example, one embodiment may implement filter 218 as a low pass filter that passes only significant voltage droops but filters out transients of a very short duration (and thus comprise high frequency components. Such a filter may be implemented using digital or analog circuitry, depending on the particular embodiments.

Throttle logic 210 also includes inhibit logic 222, which is configured to control assertion of the throttling signal. When operating in certain performance states, such as the high performance and accelerated performance states mentioned above, inhibit logic may cause assertion of the throttling signal when comparator 204 detects that the supply voltage is less than the first voltage threshold and it is not a transient filtered out by filter 218. Similarly, when UVD circuit is armed (i.e. the throttling signal is enabled), inhibit logic 222 may cause de-assertion of an otherwise asserted throttling signal responsive to comparator 205 detecting that the supply voltage has risen to at least the second voltage threshold. Inhibit logic 222 is also coupled to receive an inhibit signal from power management circuit 15 that may also cause inhibit logic 222 to inhibit assertion of the throttling signal. This includes times when transitioning to or from a performance state in which UVD circuit 20 may be armed, as well as when operating in performance states when UVD circuit 20 is not armed.

UVD circuit 20 also includes counters 208 and 209 which are coupled to the outputs of comparators 204 and 205, respectively. These counters may be used to record instances of the supply voltages crossing the voltage thresholds associated with their correspondingly coupled counters. In one embodiment, the counters may operate for a predetermined time period before being reset. If a counter indicates a crossing of a corresponding voltage threshold more than a certain number of times within the predetermined time period, power management circuit 15 may cause a change of performance state to functional circuit block 12. For example, if operating in an accelerated performance state (i.e. the highest performance state in this embodiment), an indication of more than a certain number of crossings of the first voltage threshold may indicate that throttling is occurring more often than desired. Responsive to making such a determination based on the count value from the first counter, power management circuit 15 may reduce the performance state of the functional circuit block 15 to one having both a lower clock frequency and a lower operating voltage. This will be explained in more detail with reference to FIG. 4.

Power management circuit 15 in the embodiment shown includes a state machine 231, a clock gating circuit 233, and a frequency control circuit 235. The frequency control circuit 235 may be used to set the frequency of the clock signal corresponding to the performance state at which functional circuit block 12 is to operate. In one embodiment, the frequency control circuit may be a clock multiplier circuit, while in another embodiment the frequency control circuit 235 may be a clock divider circuit. Generally speaking, frequency control circuit may be any suitable circuit for varying the frequency of the clock signal that is generated based on the received root clock signal.

Clock gating circuit 233 in the embodiment shown is used to inhibit the clock signal from being provided to functional circuit block 12. In this particular embodiment, throttling may be accomplished using clock gating circuit 233. For example, throttling of the clock signal may be accomplished by causing clock gating circuit 233 to inhibit the clock signal for a predetermined amount of time. In another example, throttling may be accomplished by causing clock gating circuit to be inhibited for one of every N cycles (e.g., where N is an integer value). In general, throttling may be accomplished by temporarily inhibiting the clock signal or temporarily reducing the frequency thereof. It is noted however, that while certain throttling mechanisms have been discussed herein, others are possible and contemplated.

State machine 231 in the embodiment shown may include a number of logic circuits, both sequential and combinational, configured to determine a performance state of functional circuit block 12, throttling actions, and other power control actions. State machine 231 in this example is coupled to UVD circuit 20 via the throttling signal, reset signals (to the counters), count value signals (received from the counters), and an inhibit signal (to inhibit logic 222). As noted above, the throttling signal may be asserted responsive to the supply voltage falling below a first voltage threshold, and may remain asserted until it has risen to a level equal to or above a second voltage threshold. State machine 231 may cause throttling of the clock signal to be performed responsive to assertion of the throttling signals by, e.g., asserting the gating signal (Gate) provided to clock gating circuit 233.

Using the count values received from counters 208 and 209, state machine 231 may determine how often the first and second threshold voltages were crossed during a predetermined time period, and may cause changes to the performance state if the number of crossings exceeds a predetermined value. The predetermined value may, in some cases, depend on the current performance state of functional circuit block 12. When the predetermined time period has elapsed, state machine 231 may assert the reset signals, thereby resetting counters 208 and 209.

State machine 231 in the embodiment shown may control the performance state of functional circuit block 12. As noted above, a performance state may be defined by an operating voltage and a clock frequency. To set an operating supply voltage, state machine 231 may generate control signals Vctrl that are conveyed to voltage regulator 11, which may then adjust the supply voltage accordingly. State machine 231 may also adjust the frequency via frequency control signals F provided to frequency control circuit 235. The performance state may be determined based on various factors, including the various performance metrics and data received from functional circuit block 12, as well as the count values received from counters 208 and 209 of UVD circuit 20.

Figure 3:
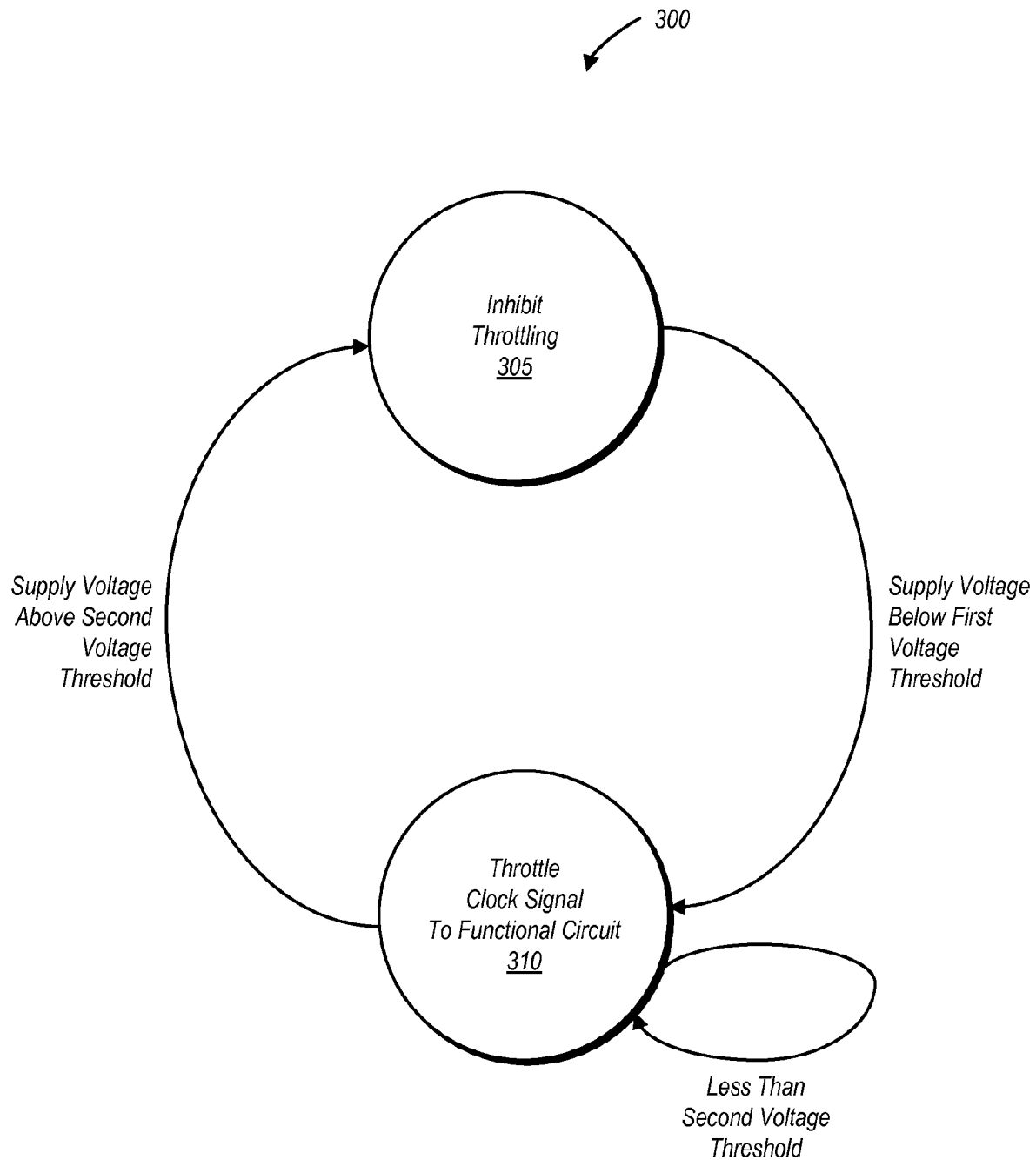
FIG. 3 is a state diagram illustrating the operation of one embodiment of an IC having an under voltage detection circuit.

Turning now to FIG. 3, a state diagram illustrating the operation of one embodiment IC 10 with UVD circuit 20 is shown. State diagram 300 assumes that UVD circuit 20 has been armed and operating within a single mode. Switching between modes is covered below with reference to FIG. 4. It is further noted that state diagram 300 may be applied to other embodiments of an IC that perform the functionality described herein using mechanisms other than those explicitly discussed herein.

In state 305, throttling is inhibited, as the throttling signal is not asserted by UVD circuit 20. If the supply voltage falls to a level that is below the first voltage threshold, a transition is made to state 310. In state 310, the throttling signal is asserted and responsive thereto, power management circuit 15 causes throttling of the clock signal. If the voltage remains at a level less than the second voltage threshold, the IC remains in state 310, with the throttling signal asserted and throttling of the clock signal continued. If the supply voltage rises to a level equal to or greater than the second threshold voltage, IC 10 may then transition back to state 305, with the throttling signal being de-asserted and inhibited therefrom as long as the supply voltage is greater than the first voltage threshold.

Figure 4:
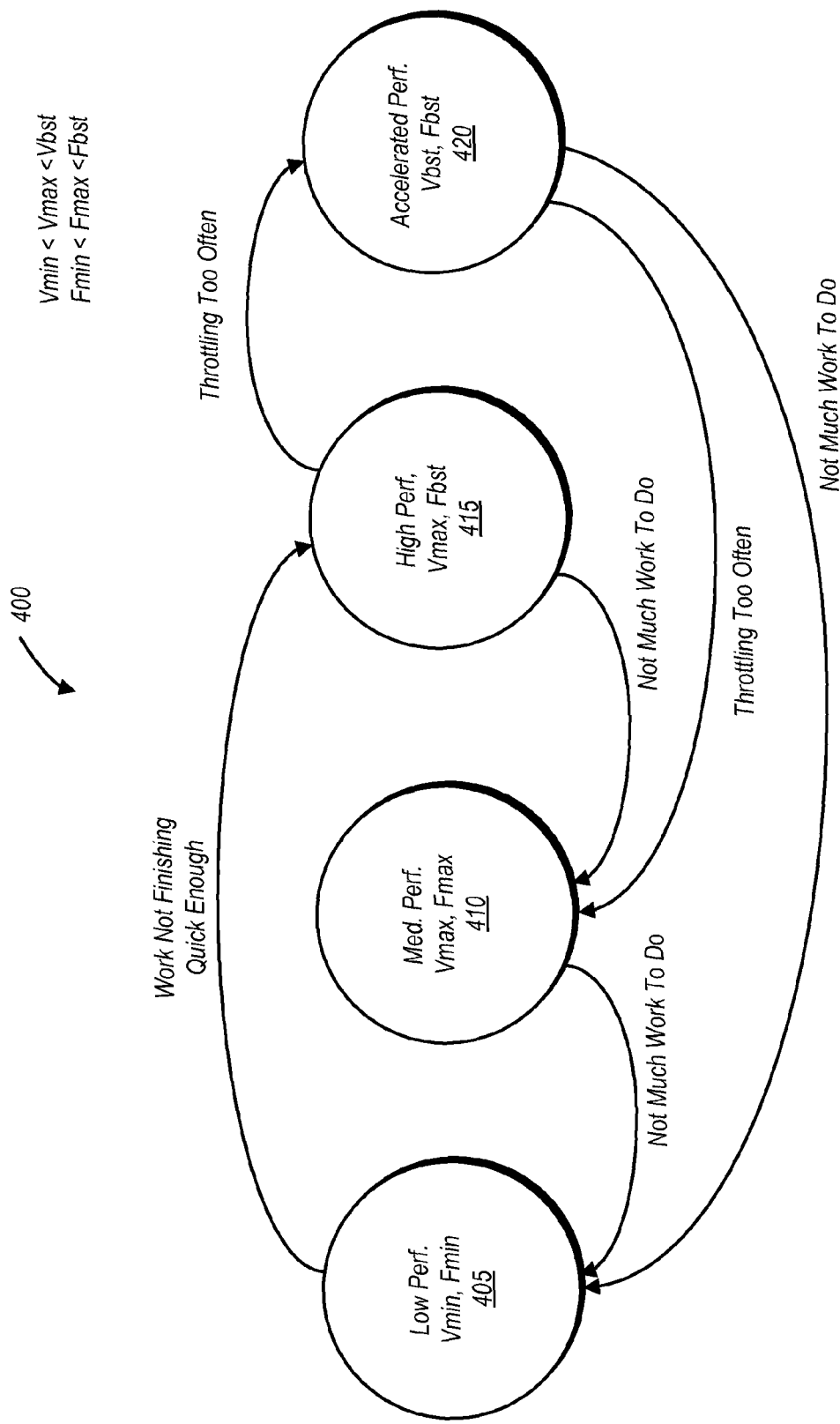
FIG. 4 is a state diagram illustrating the transition between performance states for a functional circuit operating in conjunction with an embodiment of an IC including an under voltage detection circuit.

FIG. 4 is a state diagram illustrating the transition between performance states for a functional circuit operating in conjunction with an embodiment of an IC including an under voltage detection circuit. The operation described herein may be applied to the various circuit embodiments discussed above. However, state diagram 400 may also apply to other embodiments not explicitly discussed herein, including those that use different mechanisms for detecting under voltage conditions and responding thereto. Furthermore, while only four different performance states are shown in the state diagram 400 of FIG. 4, embodiments having a greater or lesser number of performance states are also possible and contemplated.

State 405 as shown in FIG. 4 is a low performance state, with the supply voltage at a value Vmin and the clock frequency at a value Fmin. Of the states shown in FIG. 4, state 405 has the lowest capacity in terms of processing throughput. During operation in the low performance state 405, UVD circuit 20 is not armed, and no throttling of the clock signal is performed. Accordingly, if a large workload applied to functional circuit 12 is not completing fast enough, a transition may be made to the high performance state in state 415. The determination of whether a workload is being processed fast enough may be made using various mechanisms, such as a instructions or units of data in a queue waiting to be processed, indications of strict latency requirements within instructions, and so on.

In high performance state 415, the supply voltage is increased from Vmin to Vmax, while the clock frequency is increased from Fmin to Fbst. The clock frequency Fbst, may be a clock frequency that is greater than the highest rated clock frequency of IC 10 (e.g., Fmax). Operating at a clock frequency of Fbst may significantly increase the processing throughput of functional circuit 12. However, voltage droops are more likely to occur in this performance state. Accordingly, in transitioning to this performance state, UVD circuit 20 is armed and subsequently begins monitoring the supply voltage.

An exit from high performance state 415 may occur in one of at least two ways. If the processing workload is completed and subsequent workloads place significantly less processing demand on functional circuit block 12, IC 10 may transition to medium performance state 410, dropping the clock frequency from Fbst to Fmax. Another way an exit can occur from high performance state 415 is through throttling. The throttling signal may be asserted by UVD circuit 20, with throttling of the clock signal being performed thereto. If it is determined that throttling of the clock signal is occurring too often, a transition to the accelerated performance state 420 is initiated.

In transitioning to accelerated performance state 420, the supply voltage is increased from Vmax to Vbst. Similar to the accelerated frequency, the voltage Vbst may be higher than a normal, rated voltage for IC 10. Thus, in accelerated performance state 420, both the supply voltage and clock frequency may be operated out of their respective guard bands.

An exit from the accelerated performance state may occur in one of two ways. If the processing workload is complete or there is otherwise a significantly reduced processing demand, a transition to low performance state 405 may be put into effect by reducing the supply voltage and clock frequency to Vmin and Fmin, respectively. If, on the other hand, throttling continues to occur too frequently while in accelerated performance state 420, IC 10 is transitioned to the medium performance state 410, with the supply voltage and clock frequency reduced to Vmax and Fmax, respectively. This may allow completion of the processing workload, albeit slower than in the accelerated performance state 420. However, since UVD circuit 20 is not armed in the medium performance state, no throttling occurs and thus the processing workload may be allowed to continue to completion at Vmax and Fmax. An exit from the medium performance state may occur once the processing demand is low enough to enable a transition to low performance state 405. It is noted here that Vmax and Fmax may be defined as highest operating voltage and clock frequency, respectively, that reside within global guard bands for IC 10.

Figure 5:
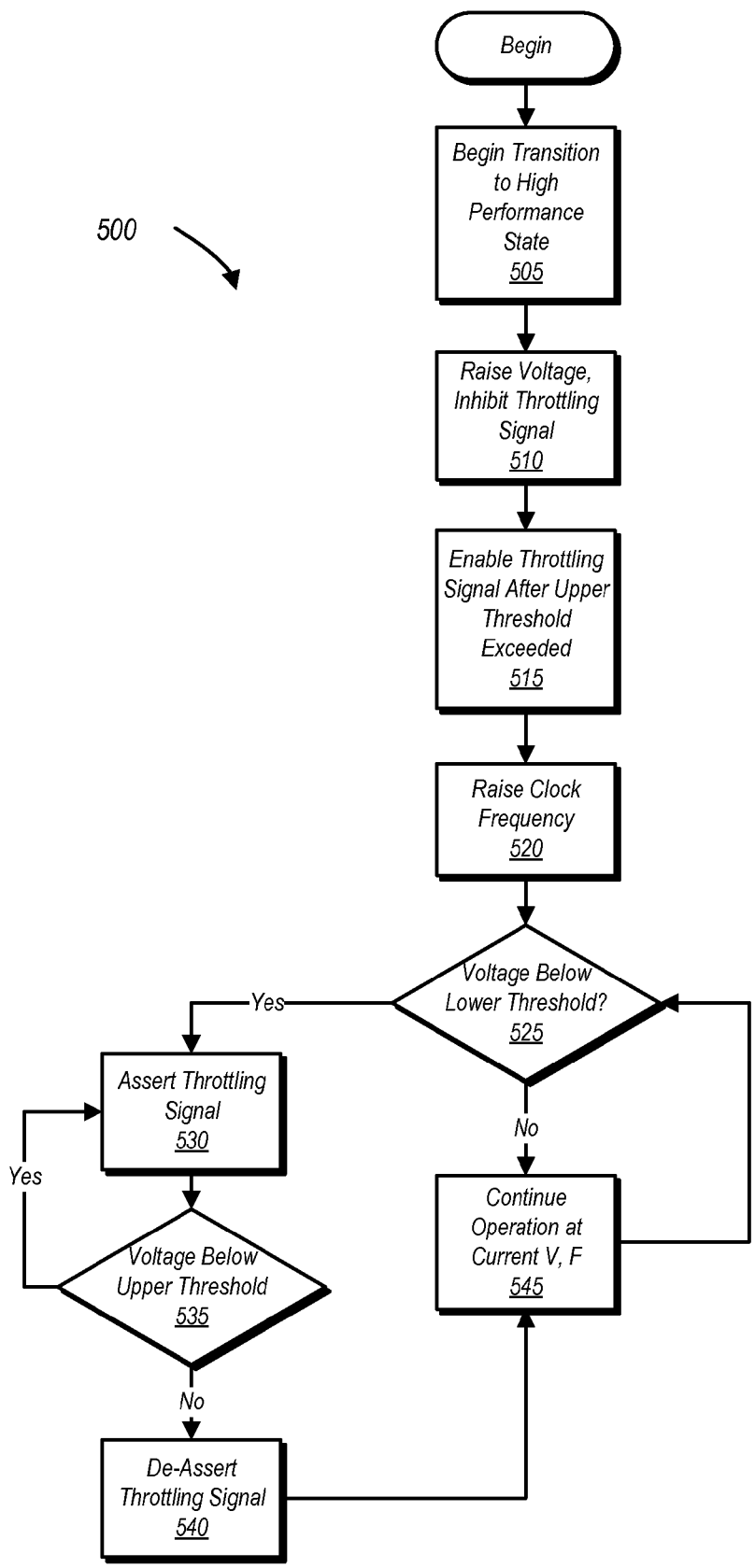
FIG. 5 is a flow diagram of one embodiment of a method for operating an IC having an under voltage detection circuit.

FIG. 5 is a flow diagram of one embodiment of a method for operating an IC having an under voltage detection circuit, such as UVD circuit 20. Method 500 may be performed using various embodiments of the circuitry discussed above. Circuit embodiments capable of performing method 500 but not otherwise discussed herein are also possible and contemplated. It is further noted that method 500 is restricted to a transition to and operation in the high performance state, and thus does not include the conditions for exit therefrom discussed above with reference to FIG. 4. This, however, is not to be interpreted as limiting, as such conditions may nevertheless apply.

Method 500 begins with a transition to the high performance state from another (block 505) from another, lower performance state. During the transition to the high performance state, the supply voltage is increased prior to the increase in the clock frequency. Furthermore, during the transition, the throttling signal is inhibited (block 510) until the supply voltage has at least reached the upper voltage threshold of the two to which the supply voltage is compared by UVD circuit 20. Once the supply voltage has exceeded the upper voltage threshold, UVD circuit 20 is considered armed (block 515) and the throttling signal is no longer inhibited from assertion in the event of a voltage droop. Thereafter, the frequency of the clock signal is raised to the value corresponding to the high performance state (block 520).

When in the high performance state, if the supply voltage not below the lower threshold (block 525, no), then operation continues at the current voltage and clock frequency. If the voltage falls below the lower threshold (block 525, yes), then the throttling signal is asserted (block 530). Thereafter, throttling of the clock signal may be performed. As noted above, this may be accomplished in various ways, such as inhibiting the clock signal altogether, or inhibiting the clock signal for a particular number M of every N cycles (e.g., where M=1 and N=2, to use one possible example). If the supply voltage remains less than the upper voltage threshold (block 535, yes), the throttling performed in block 530 continues. If the voltage subsequently rises to a value greater than the upper voltage threshold (block 535, no), then the throttling signal is de-asserted (block 540) and throttling is discontinued. Thereafter, operation continues in the high performance state at the supply voltage and clock frequency values for that sate (block 545).

The use of UVD circuit 20 as discussed herein may advantageously allow functional circuit 12 to achieve higher performance than is otherwise available when operating within prescribed limits. IC 10 (and thus functional circuit 12) may be prescribed certain operating limits with respect to supply voltage and clock frequency. These limits may be set with a guard band that in some cases may limit performance even though certain events (e.g., voltage droops below the threshold voltage) are rare even when operating above such limits. Accordingly, utilizing UVD circuit 20 to detect voltage droops on the supply voltage, power management circuit 15 may cause functional circuit block 12 to operate in one or more performance states in which the supply voltage and/or the clock frequency is above prescribed limits. This in turn may allow for greater performance, such as greater processing throughput for processing workloads. Tasks associated with these processing workloads may completed in less time, which may in turn allow power management circuit 15 to place functional circuit block 12 in a lower performance state for less intensive workloads, which might otherwise be delayed if the more intensive workloads were confined to performance states within the prescribed limits.

Figure 6:
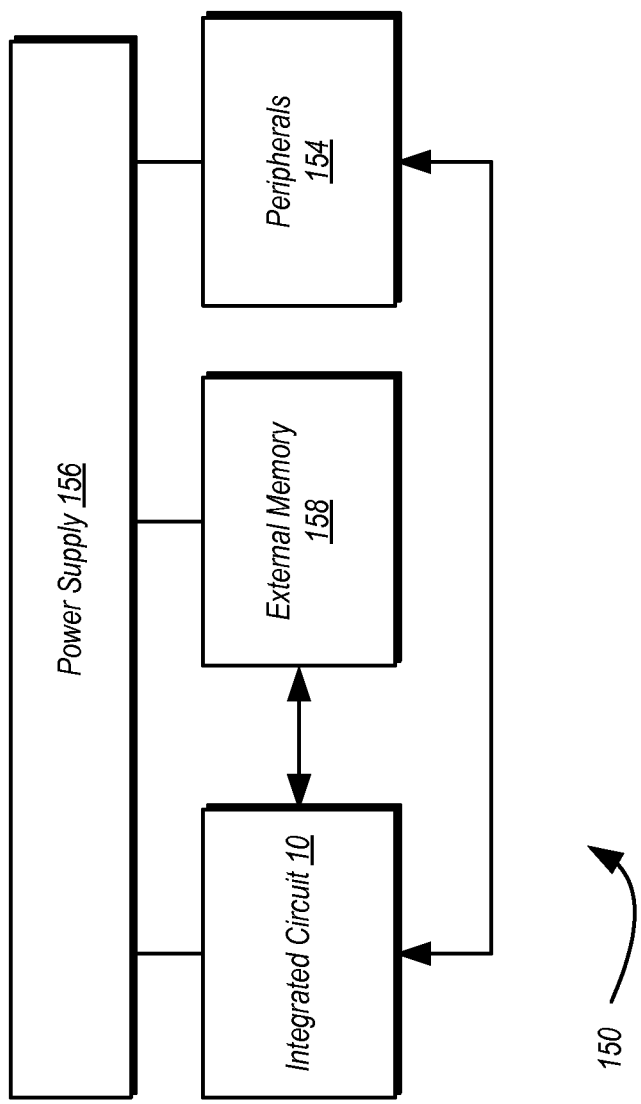
FIG. 6 is a block diagram of one embodiment of an exemplary system.

Turning next to FIG. 6, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A circuit comprising:
a first comparator configured to compare a supply voltage to a first voltage threshold;
a second comparator configured to compare the supply voltage to a second voltage threshold, the second voltage threshold being greater than the first voltage threshold; and
a logic circuit coupled to receive first and second signals from the first and second comparators, respectively, wherein the logic circuit is configured to, when a corresponding functional circuit block is operating in a high performance state, assert a throttling signal when the supply voltage falls below the first voltage threshold, and further configured to hold the throttling signal in a de-asserted state when the supply voltage is above the second voltage threshold; and
wherein the logic circuit is further configured to inhibit assertion of the throttling signal when operating in a performance state having a lower performance than the high performance state, and upon transitioning to the high performance state, inhibit assertion of the throttling signal until after a point in time that the supply voltage has increased to a value above the second voltage threshold.

2. The circuit as recited in claim 1, wherein, subsequent to asserting the throttling signal when the functional circuit block is operating in the high performance state, the logic circuit is further configured to hold the throttling signal asserted until the second comparator indicates the supply voltage has risen above the second threshold or functional circuit block exits the high performance state.

3. The circuit as recited in claim 1, further comprising a first counter configured to record instances of the supply voltage falling below the first threshold and a second counter configured to record instances of the supply voltage falling below the second threshold.

4. The circuit as recited in claim 3, further comprising a state machine configured to cause the functional circuit block to exit the high performance state and enter an accelerated performance state when the first counter indicates more than a predetermined number of assertions of the throttling signal within a predetermined time period.

5. The circuit as recited in claim 4 wherein operating in the high performance state comprises operating at a first clock frequency and a first voltage, and wherein operating in an accelerated performance state comprises operating at the first clock frequency and a second voltage that is greater than the first voltage.

6. The circuit as recited in claim 5, wherein the state machine is configured to cause the functional circuit block to exit the accelerated performance state and enter a medium performance state when if the first counter indicates more than the predetermined number of assertions of the throttling signal within a predetermined time period during operation in the accelerated performance state.

7. The circuit as recited in claim 6, wherein operating in the medium performance state comprises operating at the first voltage and a second clock frequency that is less than the first clock frequency.

8. The circuit as recited in claim 1, wherein the logic circuit further includes a filter configured to inhibit supply voltage transients from triggering the throttling signal.

9. The circuit as recited in claim 1, further comprising a sequencer configured to, when entering the high performance state, cause an increase of the supply voltage prior to causing an increase to a clock frequency.

10. A method comprising:
a first comparator comparing a supply voltage to a first voltage threshold;
a second comparator comparing the supply voltage to a second voltage threshold;
a logic circuit throttling a clock signal provided to a functional circuit block when the first comparator indicates that the supply voltage has fallen below the first voltage threshold concurrent with the functional circuit block operating in a high performance state, wherein causing throttling comprises asserting a throttling signal;
de-asserting the throttling signal when the second comparator indicates that the supply voltage has risen above the second voltage threshold;
inhibiting assertion of the throttling signal when the functional circuit block is operating in a performance state having a lower performance than the high performance state; and
upon transitioning to the high performance state, inhibiting assertion of the throttling signal until after a point in time at which the supply voltage is above the second voltage threshold.

11. The method as recited in claim 10, further comprising a first counter recording instances of the supply voltage falling below the first voltage threshold and a second counter recording instances of the supply voltage falling below the second voltage threshold.

12. The method as recited in claim 10, further comprising:
a first counter recording instances of the supply voltage falling below the first voltage threshold; and
a power management circuit causing the functional block to transition to an accelerated performance state from the high performance state responsive to determining that a number of instances of the supply voltage falling below the first voltage threshold has exceeded a predetermined number.

13. The method as recited in claim 12, further comprising:
the first counter recording instances of the supply voltage falling below the first voltage threshold when operating in the accelerated performance state; and
the power management circuit causing the functional block to transition to a medium performance state from the accelerated performance state responsive to determining that a number of instances of the supply voltage falling below the first voltage threshold has exceeded a predetermined number.

14. The method as recited in claim 10, further comprising:
the first comparator indicating that the supply voltage has fallen below the first threshold voltage;
asserting the throttling signal responsive to the supply voltage falling below the first threshold voltage;
maintaining the throttling signal as asserted when the supply voltage subsequently exceeds the first threshold voltage but is still below the second threshold voltage; and
de-asserting the throttling signal responsive to the supply voltage subsequently exceeding the second threshold voltage.

15. The method as recited in claim 10, further comprising inhibiting supply voltage transients from causing assertion of the throttling signal.

16. An integrated circuit comprising:
a functional circuit block configured to receive a supply voltage and a clock signal;
a power management circuit configured to control a performance state of the functional circuit block; and
an under voltage detection circuit, wherein concurrent with the functional circuit block operating in a high performance state, the power management circuit is configured to throttle the clock signal responsive to the under voltage detection circuit asserting a throttling signal, wherein the under voltage detection circuit includes:
first and second comparator circuits configured to compare the supply voltage to first and second voltage thresholds, respectively;
logic circuitry coupled to receive first and second signals from the first and second comparators, respectively, and configured to, when the functional circuit block is operating in a high performance state, assert the throttling signal when the supply voltage falls below the first voltage threshold, and hold the throttling signal in a de-asserted state when the supply voltage is above the second voltage threshold; and
wherein the logic circuit is further configured to inhibit assertion of the throttling signal when operating in a performance state having a lower performance than the high performance state, and upon transitioning to the high performance state, inhibit assertion of the throttling signal until after a point in time that the supply voltage has increased to a value above the second voltage threshold.

17. The integrated circuit as recited in claim 16, wherein the under voltage detection circuit further includes:
a first counter configured to record instances of the supply voltage falling below the first threshold and a second counter configured to record instances of the supply voltage falling below the second threshold;
and wherein the power management circuit further includes a state machine configured to cause the functional circuit block to exit the high performance state and enter an accelerated performance state when the first counter indicates more than a predetermined number of assertions of the throttling signal within a predetermined time period.

18. The integrated circuit as recited in claim 17, wherein the state machine is further configured to cause the functional circuit block to exit the accelerated performance state and enter a medium performance state when the first counter indicates more than the predetermined number of assertions of the throttling signal within a predetermined time period while operating in the accelerated performance state.

19. The integrated circuit as recited in claim 18, wherein operating at the medium performance state comprises operating at a first voltage and first frequency, wherein operating in the high performance state comprises operating at the first voltage and a second frequency that greater than the first frequency, and wherein operating in the accelerated performance state comprises operating at a second voltage greater than the first voltage and at the second frequency.

20. The integrated circuit as recited in claim 16, wherein the logic circuitry includes a filter configured to inhibit supply voltage transients from triggering the throttling signal.

* * * * *